United States Patent [19]

Goffe

[11] 4,409,603

[45] Oct. 11, 1983

[54] ELECTROGRAPHIC METHOD AND APPARATUS

[75] Inventor: Wiliam L. Goffe, Webster, N.Y.

[73] Assignee: Xerox Corporation, Stamford, Conn.

[21] Appl. No.: 219,180

[22] Filed: Dec. 22, 1980

[51] Int. Cl.[3] .......... G01D 15/06

[52] U.S. Cl. .......... 346/155

[58] Field of Search .......... 346/139 C, 153.1, 155, 346/156

[56] References Cited

U.S. PATENT DOCUMENTS 4,137,536 6/1979 Hinz .

FOREIGN PATENT DOCUMENTS 1475264 6/1977 United Kingdom .

1517460 7/1978 United Kingdom .

OTHER PUBLICATIONS

Rothgordt; U., "Electrostatic Printing", *Phillips Technical Review*, vol. 36, 1976, No. 3, pp. 57–70.

Rothgordt; Ulf, et al., "Triboelectric Charging of Thin Foils and Its Application to a New Recording Principle", *Transactions On Industry Applications*, vol. 1A–13, No. 3, May/Jun. 1977, pp. 223–226.

Moore; A. D., Editor, "Electrostatics and Its Applications", John Wiley & Sons, New York, pp. 290–291 and 307–331.

*Primary Examiner*—Thomas H. Tarcza

*Attorney, Agent, or Firm*—Robert A. Chittum; James F. Tao

[57] ABSTRACT

A method and apparatus are described wherein, a charge pattern is applied to an insulating imaging member by styli in contact to the insulating imaging member, the force of the styli on the imaging member being below the triboelectric threshold. More preferably, the force of the styli on the imaging member is between the triboelectric threshold and the imaging threshold.

10 Claims, 2 Drawing Figures

ELECTROGRAPHIC METHOD AND APPARATUS

This invention relates to electrography and, more particularly, to a method and apparatus for applying a charge pattern in image configuration to an insulating imaging member by the utilization of a stylus array.

It has been known heretofore to use a stylus array to charge an electroreceptor in accordance with the digital information fed to the array. In this regard, the voltage applied to the styli causes the Paschen-type breakdown of the air between the styli and the insulating electroreceptor thereby charging the electroreceptor in accordance with the information applied to the array. In this type of addressing system, the styli are maintained at a distance from the electroreceptor in order that an air gap is present between the electroreceptor and the styli thereby permitting the gas discharge to take place. Subsequently, the electroreceptor can be toned in the usual fashion followed by transfer to a suitable substrate, such as paper or the like, in the customary fashion. One drawback with regard to this type of device is that resolution suffers because of the spreading of the charge cloud as it approaches the electroreceptor and the difficulty in controlling the amount of charge leaving the styli. Thus, close tolerances with regard to the spacing of the styli from the electroreceptor is a requirement in order to maintain a constant resolution of the charge on the electroreceptor.

It has also been heretofore known to charge an electroreceptor by direct contact between the electrodes and the substrate. In this technique, the electrode engages the recording material under a significant pressure, which gives rise to a tribocharging of the recording material even in the absence of an applied voltage to the electrode. In order to counteract the effects of the charging of the recording material because of the triboelectric charging between the electrode and the recording carrier, a compensating direct current voltage is applied to the electrode. Further, because of the fairly high contact pressure required by the electrode on the recording material, electrode arrays cannot be used in this technique, and only a limited number of electrodes can be allowed to make simultaneous contact with the substrate. This effectively reduces the speed or rate of imaging as well as to cause an additional problem in that it requires relative motion between the recording material and the electrodes in both the longitudinal and transverse directions of the recording material in order to write the information onto the recording material.

It is therefore an object of this invention to provide a method and apparatus for charging an electroreceptor wherein a stylus array is employed and the styli are in direct contact with the electroreceptor.

PRIOR ART STATEMENT

The following prior art, some of which has been generally discussed above, as noted:

Philips Electronics and Associated Industries Ltd., British Pat. no. 1,475,264, June 1, 1977.

Philips Electronics and Associated Industries Ltd., British Pat. No. 1,517,460, July 12, 1978.

Hinz, Hans-Dieter, et al, U.S. Pat. No. 4,137,536, June 30, 1979.

Rothgordt, U., "Electrostatic Printing", *Philips Technical Review,* Vol. 36, 1976, No. 3, pp. 57–70.

Rothgordt Ulf, et al, "Triboelectric Charging of Thin Foils and Its Application to a New Recording Principle", *Transactions On Industry Applications,* Vol. 1A-13, No. 3, May/June 1977, pp. 223–226.

Moore, A. D., Editor, "Electrostatics and Its Applications", John Wiley & Sons, New York, pp. 290–291 and 307–331.

The pertinent portions of foregoing prior art are briefly summarized as follows

Philips Electronics and Associated Industries Ltd., British Pat. No. 1,475,264-A method of electrostatically printing alpha-numerical or facsimile characters wherein one or more electrode needles arranged on a cylinder, slide directly over a record carrier under pressure, the charge density applied to the record carrier being linearly dependent upon a voltage applied to the needles. Voltage is less than that required to ignite a gas discharge, triboelectric charging is compensated by applying a corresponding direct voltage.

Philips Electronics and Associated Industries, Ltd., British Pat. No. 1,517,460-This is a Patent of Addition of the above British Pat. No. 1,475,264 and describes a particular construction of an electrode needle for use in the method and apparatus of the stated patent.

Hinz, Hans-Dieter, et al, U.S. Pat. No. 4,137,536-Discloses a device similar to that shown in the above two British patents wherein the stylus electrodes are moved transversely of the longitudinal direction of the tape-like record carrier, which is continuously advanced in the printing region.

Rothgordt, U., "Electrostatic Printing," etc.-A review of electrostatic printing techniques including the method and apparatus disclosed in the above patents is conducted. The article further indicates that because a fairly high contact pressure is required, electrode arrays cannot be used and only a limited number of electrodes can be allowed to make contact with the substrate.

Rothgordt, Ulf, et al, "Triboelectric Charging of Thin Foils and Its Application", etc.-This technical article also discusses the device which is the subject of the three above-mentioned patents.

Moore, A. D., Editor, "Electrostatics and Its Applications"-Provides a general discussion of electrostatic imaging with a review of "Non-impact Printing" (Chapter 13). A mechanism for charging a surface by a contact stylus is offered on page 290. Also, the insulating surface may contain many conducting areas insulated from one another.

It is believed that the scope of the present invention, as defined by the appended claims, is patentably distinguishable over the foregoing prior art taken either singly or in combination one with another.

SUMMARY OF THE INVENTION

In accordance with the present invention, there is provided an electrographic method and an apparatus for applying a charge pattern to an insulating imaging member by a stylus array wherein the styli are in direct contact with the insulating imaging member, the stylus array and the insulating imaging member move relatively with respect to each other, and controlling the force of the styli on the insulating imaging member at a value below the triboelectric threshold. More preferably, the force of the styli on the simulating imaging member is maintained at a level between the triboelectric threshold and the imaging threshold.

By imaging threshold is meant the lowest force of the styli on the insulating imaging member above which charging due to the styli bias can be developed.

By triboelectric threshold is meant the highest force below which charging due to triboelectrification by an unbiased stylus on the insulating imaging member cannot be developed.

Thus, the invention contemplates the charging of an insulating imaging member by a stylus array in direct contact therewith, the force of the styli on the insulating imaging member being maintained below the triboelectric threshold, and more preferably between the triboelectric threshold and the imaging threshold. By controlling the loading of the stylus array on the insulating imaging member, between the values indicated above, several advantages are readily apparent: (1) the need to compensate for the triboelectric charging of the insulating imaging member is not necessary, thus permitting operation at lower voltages; (2) because of the absence of heavy pressure between the electrode and the insulating member, stylus arrays are practical; and (3) insulating imaging members can be fabricated from materials unsuitable where heavy pressures are required.

BRIEF DESCRIPTION OF THE DRAWINGS

Other objects and advantages of the present invention will become apparent from the following description when taken in conjunction with the accompanying drawings, in which.

While the present invention will be described in connection with a preferred embodiment thereof, it is to be understood that it is not intended to limit the invention to that embodiment. On the contrary, it is intended to cover all alternatives, modifications, and equivalents as may be included within the spirit and the scope of the invention as defined by the appended claims.

DETAILED DESCRIPTION OF THE INVENTION

Figure 1:
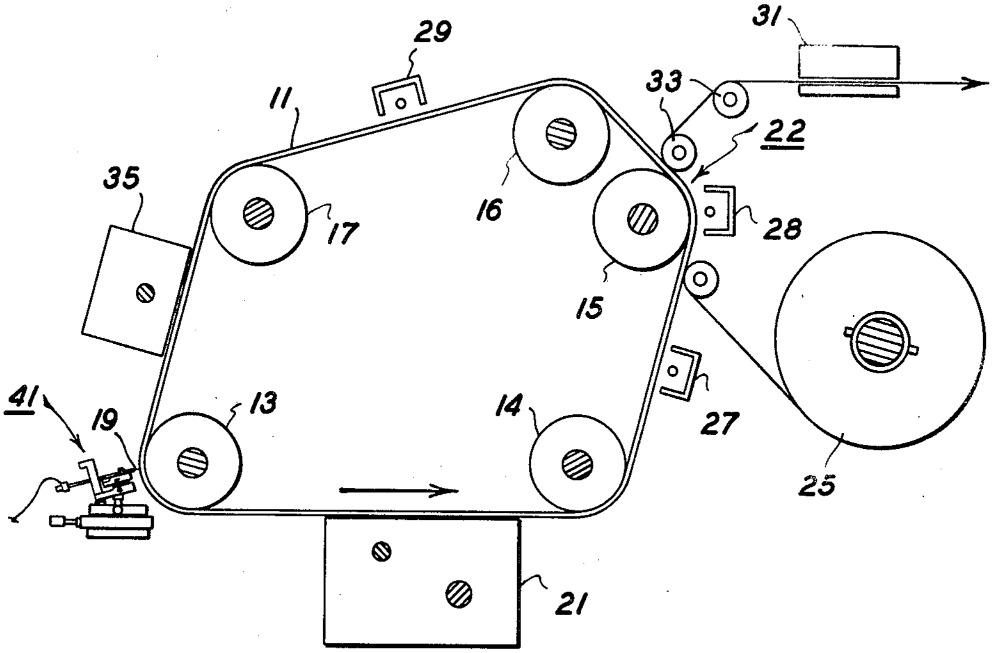
FIG. 1 is a schematic elevation view of an electrographic printing machine incorporating the features of the present invention.

For a general understanding of the illustrative electrographic printing machine incorporating the features of the present invention, reference is had to the drawings. In the drawings, like reference numerals are used throughout to designate identical elements. FIG. 1 schematically depicts the various components of an electrographic printing machine employing the stylus array, the styli being in direct contact with the electroreceptor imaging member, the stylus array being controlled in a manner which will maintain the force of the styli on the electroreceptor within the parameters set forth above.

Inasmuch as the art of electrographic printing is well known, the various processing stations employed in the printing machine of FIG. 1 will by shown schematically, and their operation described briefly with reference thereto.

As shown in FIG. 1, the electrographic printing machine employs an insulating imaging member 11 in the form of a flexible belt that travels around the series of rollers 13, 14, 15, 16 and 17. The insulating imaging member 11 is generally referred to as an electroreceptor and comprises an insulating layer and a conductive backing layer. The imaging member 11 travels around the rollers 13 through 17 counterclockwise. Charge is deposited onto the imaging member 11 by means of the stylus array 19. This stylus array 19 will be further described hereinafter with reference to FIG. 2. Development station 21 is positioned beneath the imaging member 11 and deposits toner onto the charged portion of the imaging member. The development station 21 may comprise a means suitable for depositing a single component toner material onto the imaging member 11, or may include a development means including a carrier material and a toner material. In a preferred embodiment, the development station 21 includes a means for depositing uncharged toner particles onto the insulating member 11 by what has become known in the art as dipole development. That is, the toner particles are capable of becoming polarized in a non-uniform electrostatic field, which is inherently produced on the imaging member by the stylus input. It is, of course, to be understood that any suitable method of developing the latent electrostatic image deposited by the stylus array may be used in the printing device shown in FIG. 1. Magnetic development can be used wherein a magnetically attractable carrier particle carries the toner particles into the vicinity of the charge pattern and the toner, because of the electrostatic attraction of the charge pattern, transfers from the carrier particles to the imaging member 11 in image configuration. Further, single component toner can be employed wherein the toner is charged electrostatically by any suitable means in a fashion such that the toner will transfer to the electroreceptor because of the charge on the electroreceptor and that initially placed on the toner. A further discussion of the development technique employed is not required herein as any suitable well-known development technique can be utilized and one skilled in this art will appreciate the type to employ. In addition, the latent electrostatic image formed on the imaging member need not be at high enough level to be developed by known development techniques. Non-developable latent electrostatic images formed on the imaging member, by the use of a force of the styli below the imaging threshold, can be utilized by methods other than development for example, by scanning electron microscopy.

Proceeding around the path taken by the insulating imaging member 11, a transfer station 22 is employed to transfer the developed toner image from the imaging member 11 to a suitable substrate, such as plain paper. In the figure, a paper roll supply 25 is depicted and two direct current corotron members 27 and 28 are employed to charge the toner and the paper suitably in order to have the toner leave the imaging member 11 and deposit in image configuration onto the paper. The paper then leaves the surface of the imaging member 11 over a series of rollers 33, one or more of which can be employed as a driving means for the paper to move the paper through the transfer station 22, to the fuser 31 wherein the toner material is fixed to the paper. Proceeding once again in a counterclockwise direction around the path taken by the imaging member 11, an A.C. corotron 29 neutralizes any charge remaining on the imaging member 11 prior to a cleaning station 35 provided to remove any toner remaining on the imaging member 11 preparatory to recycling the imaging member 11. The cleaning station 35 may use any suitable means known in the art such as, for example, a brush cleaner, a web cleaner, a doctor blade cleaner, either alone or in conjunction with a vacuum cleaner-type device. As the invention does not reside in the type of cleaner employed, a further discussion herein is not necessary as any suitable means can be used in the cleaning device of this printing machine.

Figure 2:
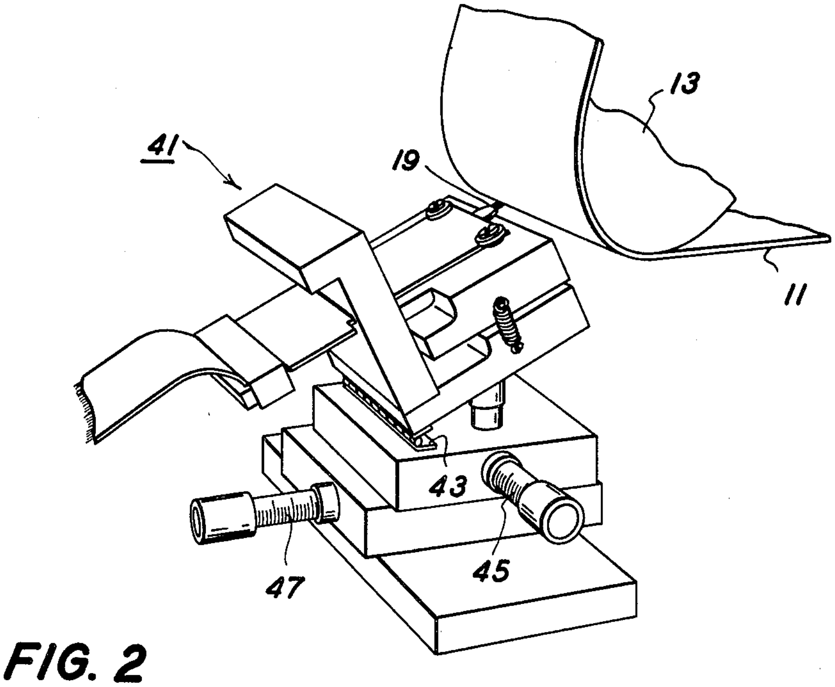
FIG. 2 is an elevation view illustrating a stylus array employed in the printing machine of FIG. 1.

Referring now to FIG. 2, the stylus array 19 is held in position by means of fixture 41. Fixture 41 is maintained in its position by means of hinge 43 and micrometer setting means 45 and 47. The micrometer means 45 moves the fixture 41 in an arc around hinge 43 which serves as a fulcrum. The micrometer means 47 moves fixture 41 toward and away from imaging member 11. By proper adjustment of the micrometer means 45 and 47, the force of contact of the stylus array 19 on the imaging member 11 is controlled. The styli, as shown, are fabricated in a cantilevered nature. That is, the metallic electrodes of each stylus extends out beyond the surface of the supporting structure and engages the imaging member 11 at the end thereof away from the supporting structure. While this is the preferred embodiment, it should be understood that the cantilevered structure described above is not mandatory but that the styli may also terminate at the end of the insulating support structure, this surface then being moved into and out-of-contact with the imaging member 11 as operation of the device commences. Also to be noted is the arrangement of the stylus array with respect to the conductors which make contact with a suitable device such as a computer, for example, for inputting digital information to each stylus of the array in order that the charge deposited on the imaging member 11 is accomplished in image configuration. The hardware required to perform the electronic input to the stylus array does not form a part of this invention and, therefore, requires no further description. Needless to say, any technique for inputting the digital information to the stylus array known in the art, such as multiplexing, may be employed herein.

The stylus array 19 may be fabricated by any suitable technique including manually positioning the individual stylus rigidly onto an insulating support structure. Further, suitable techniques such as photolithographic techniques may be employed wherein material is added to an insulating support structure in accordance with the desired configuration, or wherein a conductive material is removed from designated portions of an insulating support material where the conductor is unwanted. Any suitable conductive material may be employed as the material from which the styli are fabricated such as, for example, copper, gold, silver, aluminum, tungsten, and the like. It has been found that tungsten styli are particularly suitable because of the wear characteristics. The styli of the array are disposed in a fashion such that from about 200 to 600 styli per inch are present in the array. The styli may be disposed linearly such that preferably from about 300 to 600 styli per inch are present. Also, the styli may be arranged in a stacked fashion wherein more than one array is arranged such that the styli of one will be positioned between the styli of the other to achieve a satisfactory number of styli per inch. The number of styli in the array depends upon the resolution desired and is not a critical number. However, the resolution is further dependent upon the development apparatus employed and the number of styli in the array should be such that, when a single stylus is turned off between two styli that are turned on, this should be readily detected in the developed image. That is, toner should be deposited in the areas where the styli were turned on but not in the area where the single stylus was turned off. This determines the measure of resolution that can be achieved.

As mentioned above with regard to the background of the invention, triboelectric effects play an important role in the deposition of charge on an insulating surface by means of electrodes. This triboelectric effect, of course, depends upon several factors including the materials employed for both the styli and the insulating imaging member. Further, the triboelectric effect depends upon the force applied by the styli on the imaging member. In accordance with this invention, images can be written upon an insulating imaging member at forces less than that which will give rise to triboelectric effects and at voltages less than 100 volts. Preferably, the force on the stylus is such that the imaging threshold is reached, but at a value less than the triboelectric threshold.

Any suitable insulating material may be employed as the material from which the insulating imaging member is fabricated, for example, glass, aluminum oxide, porcelain enamel, such as fired cadmium sulfide, barium titanate, titanium dioxide in an insulating resinous binder such as polyesters, polyurethanes, epoxy resins and the like, zinc oxide in similar resinous binders, selenium, selenium, particles at the surface of thermoplastic materials such as polymethylmethacrylate and the like, resinous material such as polyurethanes, polyamides, polyesters, polyolefins such as polyethylenes, polytetramethylenes, polypropylenes and the like, suitable insulating papers, polyvinyl fluoride polymers pigmented with titanium dioxide, thermoplastic polymers having incorporated therein submicron stainless steel particles such as copolymers of styrene and hexamethylmethacrylate, polyamide polyimides, polyvinylcarbazole, polymethylmethacrylate, poly-2-vinylpyrrolidone, polystyrene and the like. The thickness of the insulating material of the imaging member may vary widely from about 0.03 to about 150 microns. As indicated above, the triboelectric threshold depends upon the material employed, both for the preparation of the stylus and for the preparation of the imaging member. Therefore the material from which the insulating imaging member is manufactured has a substantial impact upon the force of the stylus on the imaging member in order to avoid operating above the triboelectric threshold thereby imparting spurious signals to the imaging member. It has been found that the triboelectric threshold, with respect to refractory materials such as aluminum oxide and glass, is much higher than that of resinous materials, therefore the tolerance between the imaging threshold and the triboelectric threshold is greater for these materials and they are therefore preferred in the practice of this invention. However, the triboelectric threshold may be increased with regard to the particular material from which the imaging member is fabricated by several suitable techniques. For example, the triboelectric threshold can be raised by polishing the tips of the styli. Further, the triboelectric threshold can be increased by treating the surface of the insulating imaging member with various charge transfer promoting agents such as graphite, titanium dioxide, and the like.

The signal voltage applied to the styli of the stylus array is extremely low and much lower than the lowest voltage practical for creating a gas discharge of the air in the types of printing machines wherein this is necessary. It is an important advantage realized by the present invention that the voltage required by the method and apparatus herein is substantially less than the voltages required in the prior art, for example, the 350 volts shown in the art cited above. This advantage of the present invention, which makes the present method and apparatus economically attractive, results from the fact that the applied voltage needs not cancel the triboelectric charge first but is used substantially entirely for the creation of the latent electrostatic image.

As indicated above, the voltages employed herein are less than 100 volts and may be either positive or negative in character. It will also be noted in considering the list of materials set forth above for the preparation of the insulating imaging member that several of those mentioned are photoconductors. In this regard, when a photoconductive insulating material is employed as the imaging member, it is necessary that the charge pattern deposited thereon by the stylus array be accomplished in the dark in order to prevent the charge from immediately bleeding off of the imaging member. An advantage achieved by utilizing a photoconductor as the insulating member is that any charge that remains on the imaging member can be readily removed by a flood exposure of the member prior to recycling of the insulating imaging member.

In determining the thresholds for any given pair of styli material and insulating imaging material, the following techniques can be employed. For determining the triboelectric threshold, the styli are brought into contact with the imaging member by utilizing the micrometer adjustments as shown in FIGS. 1 and 2. Without any voltage being applied to the styli, the pressure exerted by the styli is gradually increased until a charge is deposited onto the imaging member which can be developed utilizing any suitable development system such as those mentioned previously herein. The pressure employed on the imaging member by the styli is then adjusted to be less than the value at which development can be detected. For determining the imaging threshold, a force less than that determined for the triboelectric threshold is applied to the styli at a given voltage, for example, 100 volts, the force applied to the styli is then decreased by adjustment of the micrometer adjustments until the level is below that which can be developed. If desired, this value at various voltages can be determined to obtain optimum performance. A suitable force level between the imaging threshold and the triboelectric threshold is then chosen for operation of the printing device as described herein. It is, of course, to be noted that the imaging threshold may be somewhat differnt depending upon the voltage applied to the stylus array and, therefore, this must be taken into consideration in determining this parameter. Generally, when the insulating imaging member is made from polymeric insulating materials, the force required to reach imaging threshold is about one half or less as compared to the force required to reach triboelectric threshold.

EXAMPLE

Images were formed on a recording member by stylus array arranged substantially as shown in FIG. 2. The recording member was made of a 1 mil thick polyvinyl fluoride material pigmented with $TiO_2$ and obtained from the du Pont Company under its tradename Tedlar PVF. An aluminum backing layer was coated on the Tedlar PVF. The stylus array was made of 10 tungsten wires each 1 mil in diameter and arranged in a row with a spacing of 2 mils center to center. Each wire stylus extended 1 mm beyond its holder and it was individually addressable. The stylus was positioned at a 45° angle to the surface of the recording member, with a force on the stylus to cause a displacement of about 2 mils. In operation, the stylus array was biased with 100 volts positive, and the recording member moved relative to the stylus array at a speed of 10 inches per second. The charge pattern deposited by the stylus array, or the latent electrostatic image, was developed with a 2-component magnetic brush development technique. It was found that no visible image formed in the areas of the recording member contacted by the stylus array while no electric bias or voltage was applied to the stylus array, but that in areas contacted by the stylus array while under bias clear images were formed. The developed image may then be transferred to a piece of plain paper or be fused in situ on the recording member.

While the invention has been described in considerable detail, it is apparent that alteration can be made by one skilled in this art without departing from the spirit of the invention or the scope of the claims and that any suitable materials for either the stylus or the imaging member may be employed herein.

What is claimed is:

1. An improved apparatus for applying a charge pattern to an insulating imaging member by a stylus array of the type wherein the styli of the array are in direct contact with the insulating imaging member, and the insulating imaging member and the styli move relatively with respect to each other, the improvement comprising:

an adjustable stylus array having each stylus in the array resiliently held into contact with the insulating imaging member;

means for applying a signal voltage to the styli in said array for production of a charge pattern on the insulating imaging member; and means for adjusting said stylus array to obtain a force of contact between the styli in the array and the insulating imaging member that is below the force of contact necessary to develop a triboelectric charge on the insulating imaging member because of the rubbing contact with the styli during relative movement between the styli and the insulating imaging member, so that there will be substantially no background charge on the insulating imaging member.

2. The apparatus of claim 1 wherein the insulating imaging member is a refractory.

3. A method of applying a developable charge pattern to an insulating imaging member which comprises:

resiliently contacting the insulating imaging member with a plurality of electrodes which are held in an adjustable supporting means;

moving the insulating imaging member relative to the electrodes;

applying a signal voltage of not more than about 100 volts to the electrodes in accordance with the information to be recorded on the insulating imaging member; and adjusting said adjustable supporting means to obtain a force by the electrodes on the insulating imaging member which is below that force required to produce a triboelectric charge, so that the background or noise charge normally produced by the triboelectric charge is substantially avoided and thus enabling a signal voltage as low as about 100 volts to produce a developable charge pattern on the insulating imaging member.

4. The method of claim 3 wherein the force required to initiate triboelectric charging is increased by treating the surface of the insulating imaging member with a material that promotes charge transfer.

5. The method of claim 4 wherein the surface of the insulating imaging member is rubbed with graphite.

6. The method of claim 4 wherein the surface of the insulating imaging member is rubbed with titanium dioxide.

7. The improved apparatus of claim 1, wherein the signal voltage applied to the styli is not more than about 100 volts.

8. The improved apparatus of claim 1, wherein said resiliently held styli are cantrilevered, the means for adjusting the stylus array positioning the unsupported ends of the cantilevered styli into contact with the insulating imaging member and at an angle therewith of less than 90 degrees, wherein the flexure of each the cantilevered styli provides constant, individual resilient and uniform contact with the insulating imaging member.

9. The improved apparatus of claim 8, wherein the quantity of the styli in said stylus array is about 200 to 600 per inch, the styli are disposed in a linear array, and the styli material is tungsten.

10. The improved apparatus of claim 9, wherein the styli are arranged in at least two adjacently stacked, linear arrays so that the styli of one array is positioned between the styli of the other linear array to increase the resolution of the charge pattern on the insulating imaging member.

* * * * *